Sept. 26, 1961   F. R. ABBOTT   3,002,188
HARMONIC WAVE BEAM-STEERING SYSTEM
Filed April 14, 1959   3 Sheets-Sheet 2

$\theta_n = nkd \sin \phi$

INVENTOR
FRANK R. ABBOTT
BY
ATTORNEYS

Sept. 26, 1961  F. R. ABBOTT  3,002,188
HARMONIC WAVE BEAM-STEERING SYSTEM
Filed April 14, 1959  3 Sheets-Sheet 3

INVENTOR.
FRANK R. ABBOTT
BY
ATTORNEYS

United States Patent Office 3,002,188
Patented Sept. 26, 1961

3,002,188
HARMONIC WAVE BEAM-STEERING SYSTEM
Frank R. Abbott, San Diego, Calif., assignor to the United States of America as represented by the Secretary of the Navy
Filed Apr. 14, 1959, Ser. No. 806,412
11 Claims. (Cl. 343—100)
(Granted under Title 35, U.S. Code (1952), sec. 266)

The invention described herein may be manufactured and used by or for the Government of the United States of America for governmental purposes without the payment of any royalties thereon or therefor.

This invention relates to a harmonic wave beam-steering system and more particularly to a beam-steering system utilizing matrix phase compensators.

In the prior art electromagnetic and/or sound energy directivity has been accomplished by utilizing the beam forming characteristics of an antenna or hydrophone array and mechanically positioning the array to form a beam at the desired bearing. A second method also utilizes the beam forming arrays mentioned above but accomplished beam steering by introducing in the various elements a predetermined phase or time delay for a given bearing of interest in conjunction with an omni-directional transmission. The rotated arrays, of course, present serious limitations due to bulk particularly at the lower frequencies and, alternatively, time delay lines for electronic steering have the disadvantages of excessive cost and extremely low permissible power. This, of course, is the price of broad frequency response. Another serious disadvantage of the delay line type of beam steering network lies in the inherent attenuation of the signal and dissipation of energy due to the passing of the wave through the delay line itself and the dissipation in the necessary terminal impedance thereof.

It is thus an object of the present invention to provide a multi-beam steering network which introduces negligible attenuation to the signal of interest.

A further object of the invention is to provide a beam steering network utilizing passive elements only.

Still another object of the present invention is the provision of a bilinear multi-terminal matrix phase compensator which is inexpensive, compact, and utilizes no moving parts.

According to the invention a plurality of energy sensing and radiating elements capable of sensing and radiating either sound or electromagnetic energy of a given frequency, are spatially disposed for sensing and transmitting energy in a given direction. It is to be understood that the term transducers in this specification refers to either electromagnetic or acoustic radiation and sensing elements. A plurality of pairs of reactive coupling means couple energy to or from each transducer element. At a given angle of interest in the case of reception, for example, energy will be induced in each element at a specific relative phase. In the case of a line array receiving a broadside wave each element will receive energy which is in phase with every other element, and if added algebraically would result in an amplitude directly proportional to the number of energy sensing elements. Energy arriving from a source at an acute angle to the plane of the array will induce energy in each element in a predictable phase relationship with each other. Taking an end element as the reference element the energy in the next receiving element would be at a phase $\theta$ relative to the first or reference element. This energy is passed through a pair of coupling devices to yield two outputs, one at an amplitude directly proportional to the sine function of the angle $\theta$, and the other at an amplitude directly proportional to the cosine function of the angle $\theta$. Each of the other transducer elements couple in a similar manner, yielding sine and cosine amplitude pairs, which again are proportional to the sine and cosine functions of the angle of phase displacement of the signal induced in the corresponding sensing elements relative to the phase of the reference element. Each sine output is then added electrically in serial relationship, and each cosine element output is added electrically in serial relationship, giving a resultant of two signals displaced substantially by 90 degrees, each substantially equal in amplitude to the energy induced in any one element times ½ the number of elements in the array. These signals are then shifted in phase by 90 degrees relative to one another which places them in an in-phase or zero relative phase relationship. The two signals can then be passed through a summing network which yields a single signal substantially equal in amplitude to the amplitude of energy induced in any one of the sensing elements times the number of elements in the array. The summing network is then coupled to a suitable utilization device. In the case of transmission, the reverse of the above takes place utilizing the identical elements. Obviously the phase shifter in this case becomes a phase splitter. Thus it is seen that the disadvantages of the prior art are overcome in that for any given direction of beam desired, a sine and cosine amplitude channel is coupled to each network transducer element, which does not result in objectionable attenuation, and requires no moving parts.

Other objects and many of the attendant advantages of this invention will be readily appreciated as the same becomes better understood by reference to the following detailed description when considered in connection with the accompanying drawings in which like reference numbers designate like parts throughout the figures thereof and wherein.

Figure 1:
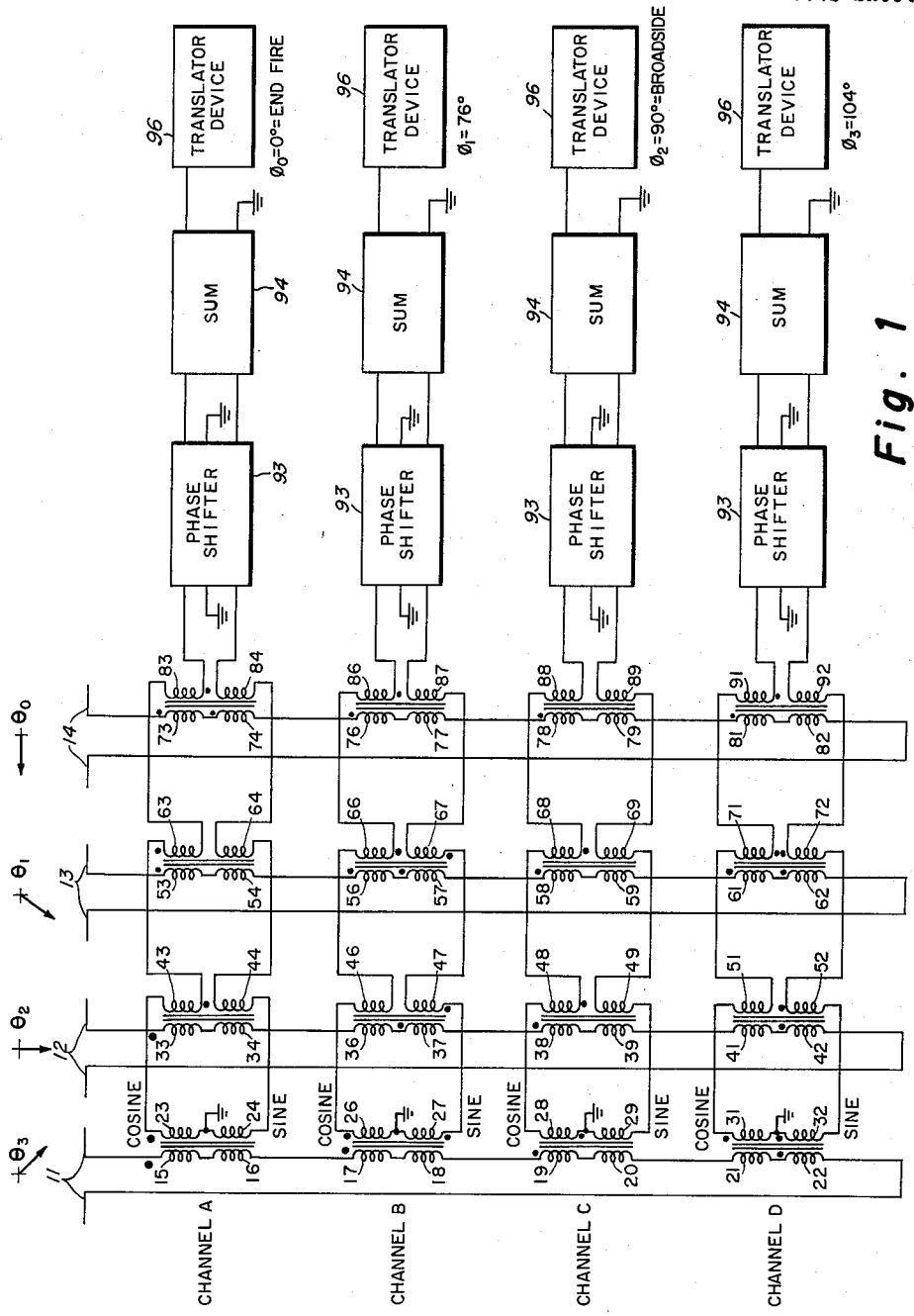
FIG. 1 is a schematic diagram of one embodiment of the invention utilizing transformer coupling.

Referring now to FIG. 1 of the drawings there is shown in schematic form a broadside array of transducers at 11, 12, 13 and 14. Transducer 11 is transformer coupled through primary windings 15, 16, 17, 18, 19, 20, 21 and 22 to secondary windings 23, 24, 26, 27, 28, 29, 31 and 32 respectively. Transducer 12 is transformer coupled through primary windings 33, 34, 36, 37, 38, 39, 41 and 42 to secondary windings 43, 44, 46, 47, 48, 49, 51 and 52 respectively. Transducer 13 is transformer coupled through primary windings 53, 54, 56, 57, 58, 59, 61 and 62 to secondary windings 63, 64, 66, 67, 68, 69, 71 and 72 respectively. Transducer 14 is transformer coupled through primary windings 73, 74, 76, 77, 78, 79, 81 and 82 to secondary windings 83, 84, 86, 87, 88, 89, 91 and 92 respectively. The corresponding secondaries associated with each transducer are connected in series. Thus secondaries 23, 43, 63 and 83 are connected in series, one end of secondary winding 23 being grounded, secondaries 24, 44, 64 and 84 are connected in series, one end of secondary winding 24 being grounded, secondaries 26, 46, 66 and 86 are connected in series, one end of secondary 26 being grounded, etc. The eight secondaries associated with each transducer comprise four channels: Channel A, channel B, channel C and channel D. The outputs of each channel which are the series aiding resultant of the associated secondaries are each coupled to a separate phase shifter 93. The output of each phase shifter is coupled to a separate summation network 94 and then to a translation device indicated at 96.

*Operation*

Figures 4, 6:
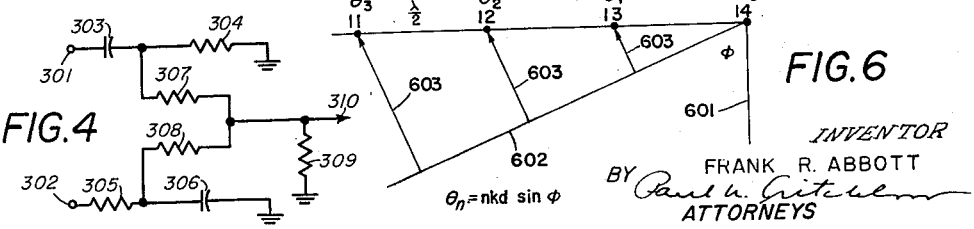
FIG. 4 is a schematic diagram of a 90 degree phase shifter and summing network.
FIGS. 6 illustrates the geometrical relationship between bearing of interest $\phi$ and associated electrical phase compensation $\theta$ for proper beam formation.

The general operation of the embodiments of the systems is shown schematically in FIG. 6 which illustrates the geometrical relationship between bearing of interest $\phi$ and associated electrical compensation $\theta$ for proper beam formation. The transducers 14, 13, 12 and 11 are assumed to have the commonly employed half wave spacing, therefore, the length of the transducer array is two wavelengths, $2\lambda$. The line 601 represents a wavefront corresponding to an end-fire signal in the plane of the transducer array while 602 indicates another wavefront at an angle or bearing of interest $\phi$, measured with respect to the reference or end-fire signal 601. Vectors 603 are at right angles to the wave 602 and merely indicate the direction of propagation of the signal source or conversely, if the arrows were reversed, would indicate the direction in which the beam or wavefront is propagating if the transducer array is being driven from a signal source. As stated previously, the spacing between transducers, i.e., between 11 and 12, for example, is equal to $\lambda/2$. The general relationship between $\theta_0$, $\theta_1$, $\theta_2$ and $\theta_3$ may be expressed by the equation $\theta_n = nkd$ sine $\phi$ where $\theta_n$ is the phase relationship existing at a transducer $n$; $n=$the transducer station measured from the zero reference point, in the present case transducer 14; $K=2\pi\lambda$;

$$d = \frac{\lambda}{2}$$

$\lambda=$wavelength at the frequency of propagation or the received frequency; and $\phi=$the bearing of interest, i.e., the angle between a zero reference and the wavefront of interest measured from the end-fire reference. Therefore an end fire signal in the plane of the transducer array will induce a signal in transducers 14 and 12 which are in phase and in transducers 13 and 11 which are in phase but 180 degrees out of phase with transducers 14 and 12. Thus if these signals are to be added numerically the phases of the signals induced in transducers 11 and 13 must be reversed before they can be added to the signals induced in transducers 12 and 14. This is accomplished by reversing phase relationships of the secondary windings of the channel corresponding to direction $\phi_0$. Thus, if channel A is the $\phi_0$ channel, windings 23 and 63 will be opposite phase to windings 43 and 83. The output will then correspond to the amplitude of the induced signal times the number of transducers. Windings 23, 43, 63 and 83 will have a turns ratio which is directly proportional to the cosine of the phase angle of the induced signal in each respective transducer with respect to the phase of the signal induced in the reference transducer, which in this case is transducer 14. Assuming that the reference transducer will always have the relative phase of zero the cosine winding 83 will then have a maximum turn ratio or coupling from primary 73. Winding 63 coupling energy from transducer 13 which is 180 degrees out of phase with the reference phase of transducer 14 will then correspond to the cosine of 180 degrees or minus one, i.e. the coupling phase will be reversed. Secondary winding 43 will correspond to the cosine of the phase angle of the signal induced in transducer 12 with respect to transducer 14. In this case there is zero phase difference, the cosine of which is plus one, which again indicates a maximum coupling ratio. Transducer 11 is 180 degrees out of phase with the reference transducer 14, which indicates again a phase reversal at a maximum between primary 15 and secondary 23. The other windings of channel A correspond in coupling amplitude to the sine function of the phase angle of the signal induced in each corresponding transducer. In this case the sine of the phase angle of either zero or 180 degrees is zero and which corresponds to zero coupling to secondaries 24, 44, 64 and 84. Windings 24, 44, 64 and 84 are represented schematically since this particular angle is merely being used for illustrative purposes. Thus, the output to phase shifter 93 from channel A will be the arithmetical sum of the signals induced in the transducers as they are added at secondaries 23, 43, 63 and 83, no output being taken at secondaries 24, 44, 64 and 84. This will correspond to a beam angle of zero degrees.

Assuming now that the azimuthal angle of interest is 76 degrees, which is represented by $\phi_1$, it can be shown that there will be a 45 degree phase displacement between transducers 14 and 13, 13 and 12, and 12 and 11. Again the secondary windings coupling energy from transducer 14 being at the zero or reference phase will correspond to maximum coupling and winding 87, since its coupling is determined by the sine of the angle, will be zero. Transducer 13 having a signal displaced 45 degrees with respect to the reference signal, will then have a coupling factor, corresponding to the cosine and sine of the phase angle in the $\phi_1$ channel or channel B which is .707 in each case. Assuming a maximum secondary winding of 100 turns, windings 66 and 67 will then have approximately 71 turns each. Transducer 12 will have a signal induced which is 45 degrees further removed from transducer 13, or 90 degrees out of phase with the reference phase. Thus cosine secondary 46 will have zero coupling and sine secondary 47 will have maximum coupling or in this case 100 turns. Transducer 11 will have a signal induced which is 45 degrees further removed or 135 degrees out of phase with the reference phase. Thus winding 26 corresponding to the cosine of the angle will have minus 71 turns and winding 27 which corresponds to the sine of the phase angle will again have 71 turns. The minus sign of winding 26 corresponds to a reversal of phase. Thus it is seen that channel B corresponds to a beam direction of 76 degrees.

Assuming a direction of interest at $\phi_2$ or 90 degrees removed from $\phi_0$, it will be appreciated that all transducers will be excited substantially in phase thus windings 28, 48, 68 and 88 of channel C corresponding to the cosine of the angle of phase displacement will all have a maximum of 100 turns and windings 29, 49, 69 and 89 corresponding to the sine function of the angle displacement will have zero turns.

Assuming now a beam of interest from direction or angle $\phi_3$ of 104 degrees it can be shown that each transducer will again be excited 45 degrees out of phase with the adjacent transducer. The only difference between the signals at a 104 degrees and 76 degrees will be in direction of phase displacement. Thus the secondary windings of channel D will be identical to the secondary windings of channel B except the phase will be reversed in one secondary of each transformer, except the reference windings 91 and 92, thereby preventing an ambiguity between the two channels.

It can be appreciated at this point that any angle of radiation or beam of interest to the transducer array will induce signals of a predictable phase relationship in the individual transducers, and this in turn can be coupled through a given channel having coupling factors corresponding to the cosine and sine of the angle of phase displacement. Hence, the number of beams available is limited only by the number of channels in the summing matrix and of course the sharpness of the array used in conjunction therewith.

Figure 2:
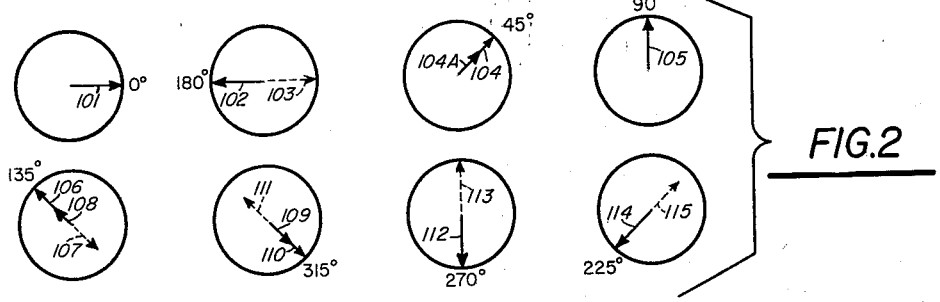
FIG. 2 illustrates a vector analysis of the systems of FIGS. 1 and 3.

Referring now to FIG. 2 there is shown a plurality of vector quantities. Each of these represents the amplitude and relative phase of energy induced in a given transducer of FIG. 1 from a given angle. It is to be noted that vectors 104, 106, 110 and 114 all indicate the amplitude of energy actually induced in a given transducer, while the vector quantities indicated at 104A, 107, 108, 109, 111 and 115 indicate the amplitude actually coupled to the various secondary windings which corresponds to the 71 turns of secondary windings. When the phase of couplings of a given secondary windings such as winding 26 is indicated with the plurality dots at the tops of both primary and secondary this means there is a 180 degrees phase reversal from the vector direction as shown. At angle $\phi_0$ there is induced at hydrophone 14 energy at an amplitude and phase as indicated by vector 101. The cosine windings of channel A coupled to element 14 are thus at a maximum for the purpose of this analysis and correspond to 100 turns. Transducer 13 will receive from the same wave, energy 180 degrees out of phase, but also at a maximum indicated by vector 102. Winding 63 is then reversed in phase as compared to winding 83 and also at 100 turns, thereby resulting in vector 103 at the output of winding 83. Windings 64 and 84 corresponding to the sine of the relative phase will be zero at both the zero and 180 degrees relationship. In transducer 12 energy is induced in phase with the reference transducer 14 so winding 43 will be identical to winding 83. In transducer 11 the phase and magnitude will be identical to that of transducer 13 and consequently winding 23 will be identical in phase and magnitude to winding 63 which is also reversed in phase resulting in vector 103. Again windings 24 and 44 corresponding to the sine of the phase angle will have zero windings. Summing vectorially the energy from the cosine side of channel A:

| | |
|---|---|
| Winding 23 (vector 103) | −100∠180° |
| Winding 43 (vector 101) | 100∠0° |
| Winding 63 (vector 103) | −100∠180° |
| Winding 83 (vector 101) | 100∠0° |
| Sum | 400∠0° |

Since the sine windings of channel A are all zero, the amplitudes at the inputs to phase shifter 93 will be 400∠0° and 0. Utilizing a conventional 45° symmetrical phase shifter and summation network as shown in FIG. 4, the output to the translation device will be 400∠45°.

Energy received from direction $\phi_1$, which in this case is 76 degrees, will induce in hydrophone 14 a voltage the vector of which is shown in 101 in FIG. 2 since this is the reference transducer. The voltage induced in transducer 13 from this angle of reception will differ in phase from that in transducer 14 by 45 degrees i.e. it will lag 45 degrees. This is shown by vector 104. Since the sine and cosine of 45 degrees are both .707, windings 66 and 67 will then have 71 turns apiece, corresponding to the maximum of 100 turns. The voltage induced in transducer 12 is 45 degrees further lagging than in transducer 13 and thus 90 degrees removed from the reference phase induced in transducer 14 as shown by vector 105. The cosine of 90 degrees being zero, winding 46 will have zero turns, and the sine of 90 degrees being one, winding 47 will then have 100 turns. The signal induced in transducer 11 is 45 degrees still further removed from that induced in transducer 12 and is indicated vectorially at 106. The cosine at 135 degrees is minus .707 and the sine is plus .707. Thus winding 26 will be equal to winding 66 with 71 turns but of opposite phase as indicated by vector 107 and winding 27 will also have 71 turns and be of a phase and amplitude as indicated by vector 108. Summing vectorially the energy from the cosine side of channel B:

| | |
|---|---|
| Winding 26 (vector 107) | −71∠135° |
| Winding 46 | 0 |
| Winding 66 (vector 104) | 71∠45° |
| Winding 86 (vector 101) | 100∠0° |
| Sum | 200∠0° |

Summing vectorially the energy from the sine side of channel B:

| | |
|---|---|
| Winding 27 (vector 108) | 71∠135° |
| Winding 47 (vector 105) | 100∠90° |
| Winding 67 (vector 104) | 71∠45° |
| Winding 87 | 0 |
| Sum | 200∠90° |

Shifting each output by 45 degrees in phase shifter 93, i.e. the cosine channel +45° and the sine channel −45° gives:

| | |
|---|---|
| Cosine channel | 200∠45° |
| Sine channel | 200∠45° |
| Sum | 400∠45° |

A signal from direction $\phi_2$, or normal to the array as indicated, will induce a voltage in all transducers substantially in phase. Thus cosine windings 28, 48, 68 and 88 will all have 100 turns of the same phase indicated by vector 101 and sine windings 29, 49, 69 and 89 will have zero turns, yielding outputs identical to channel A. Notice that no phase reversal of cosine windings are necessary.

A signal arriving from angle $\phi_3$ or 104 degrees will induce currents in the hydrophones 45 degrees removed from one another, but in this case hydrophone 13 will lead 14 in phase, hydrophone 12 will lead 13 in phase relationship and hydrophone 11 will lead 12 in phase relationship. Hydrophone 14 being the reference phase element will again correspond to zero phase displacement and cosine winding 91 will again be 100 turns indicative of zero phase and sine winding 92 zero turns. The voltage induced in transducer 13 will lead the reference signal induced in transducer 14 and is indicated by vector 110 at 315 degrees. Winding 71 corresponding to the cosine of the relative phase angle will have 71 turns indicated by vector 109 and winding 72 corresponding to the sine of the relative phase angle will have minus 71 turns shown by vector 111 indicating opposite phasing of winding 71. The signal induced in transducer 12 will be 45 degrees ahead or leading the phase of the signal induced in transducer 13 and thus will be at a relative phase angle of 270 degrees. This magnitude and phase is indicated by vector 112. The cosine of 270 degrees being zero, winding 51 will have zero turns, and the sine of 270 degrees being minus one, winding 52 will have 100 turns of the phase opposite to winding 91 shown by vector 113 and in phase with winding 92. The signal induced in transducer 11 will again lead that of the signal induced in transducer 12 by 45 degrees which will place its relative phase at 135 degrees ahead of the reference phase as indicated by vector 114. The cosine and the sine of 225 degrees both being minus .707, windings 31 and 32 will have 71 turns each and be of the same relative phase i.e. the same phase as windings 52 and 72, as indicated by vector 115. Summing vectorially the energy from the cosine side of channel D:

| | |
|---|---|
| Winding 31 (vector 115) | −71∠225° |
| Winding 51 | 0 |
| Winding 71 (vector 109) | −71∠315° |
| Winding 91 (vector 101) | 100∠0° |
| Sum | 200∠0° |

Summing vectorially the energy from the sine side of channel D:

| | |
|---|---|
| Winding 32 (vector 111) | −71∠315° |
| Winding 52 (vector 113) | −100∠270° |
| Winding 72 (vector 115) | −71∠225° |
| Winding 92 | 0 |
| Sum | 200∠90° |

Shifting each output by 45° in phase shifter 93, i.e. the cosine channel +45° and the sine channel −45° gives:

Cosine channel _____ 200∠45°
Sine channel _____ 200∠45°

Sum _____ 400∠45°

Referring now to FIG. 4 there is shown a conventional symmetrical 45 relative degree phase shifter and summing network. The cosine half of a given channel is coupled to terminal 301 and the sine half of that channel is coupled to terminal 302. The cosine half will then be shifted 45 degrees between capacitor 303 and resistor 304 which are designed to have equal impedance at the frequency of interest, and the sine half will be shifted 45 degrees in the opposite direction between resistor 305 and capacitor 306 which again are designed for equal impedance at the frequency of interest. The outputs of these two phase shifters being in phase are then arithmetically summed through resistors 307, 308 and 309, and the output being in phase taken at terminal 310.

Figure 3:
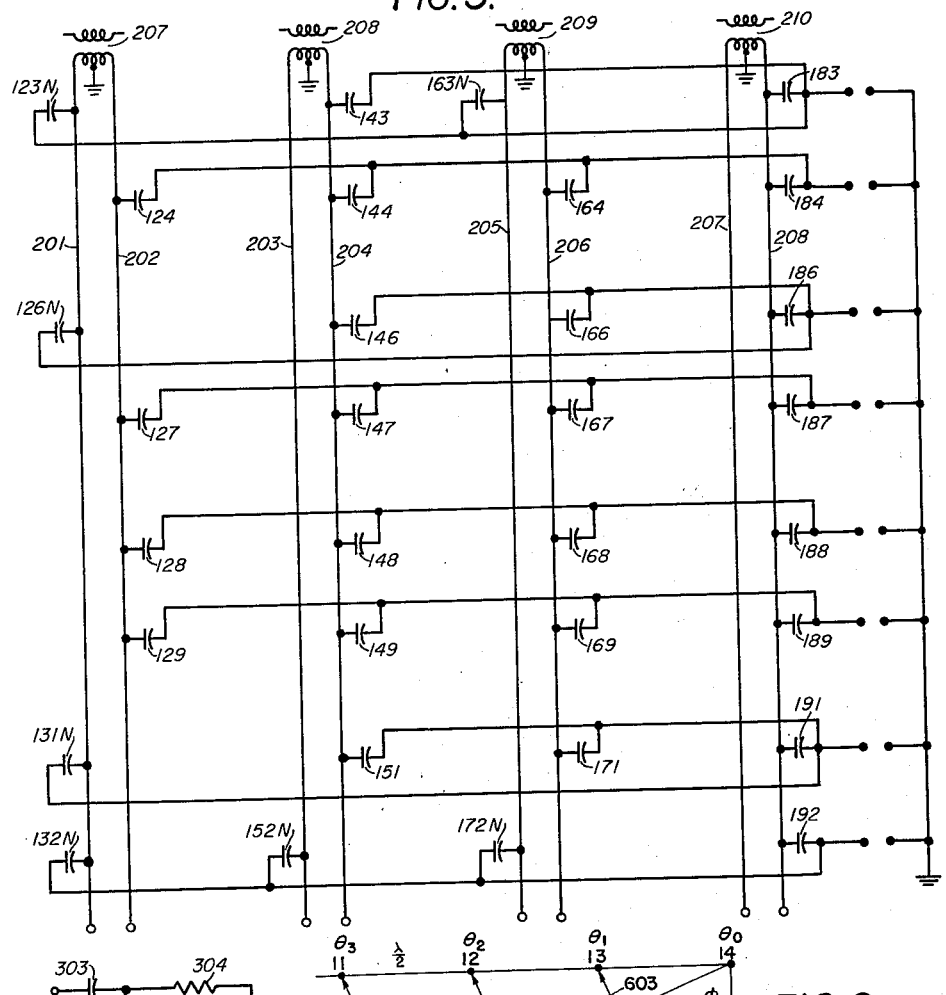
FIG. 3 is a schematic diagram of another embodiment of the invention utilizing capacitive coupling.

Referring now to FIG. 3 of the drawings there is shown in schematic form a capacitive matrix which is designed for use with the transformer array of FIG. 1. Transformers 207, 208, 209 and 210 couple the capacitor matrix to transducers 11, 12, 13 and 14 respectively. Coupled to transformer 207 are capacitors 123N, 124, 126N, 127, 128, 129, 131N and 132N. Coupled to the transformer 208 are capacitors 143, 144, 146, 147, 148, 149, 151 and 152N. Coupled to transformer 209 are capacitors 163N, 164, 166, 167, 168, 169, 171 and 172N. Coupled to transformer 210 are capacitors 183, 184, 186, 187, 188, 189, 191 and 192. It is noted that all of the capacitors which are coupled to one side of the secondaries of transformers 207, 208, 209 and 210 have an N following their number. The N is to indicate negative i.e. when a phase reversal is required as for example in the transformer matrix in FIG. 1. Since coupling cannot be reversed within capacitors, the capacitors are coupled to the opposite side of the line giving the opposite phase. Lines 201, 203, 205 and 207 will indicate the negative phase and lines 202, 204, 206 and 208 indicate the positive phase. The relative admittances of the capacitors of FIG. 3 will be identical to the relative number of windings of the transformers of FIG. 1. Since the vector analysis of FIG. 1 applies identically to FIG. 3 further detail is deemed unnecessary.

Figure 5:
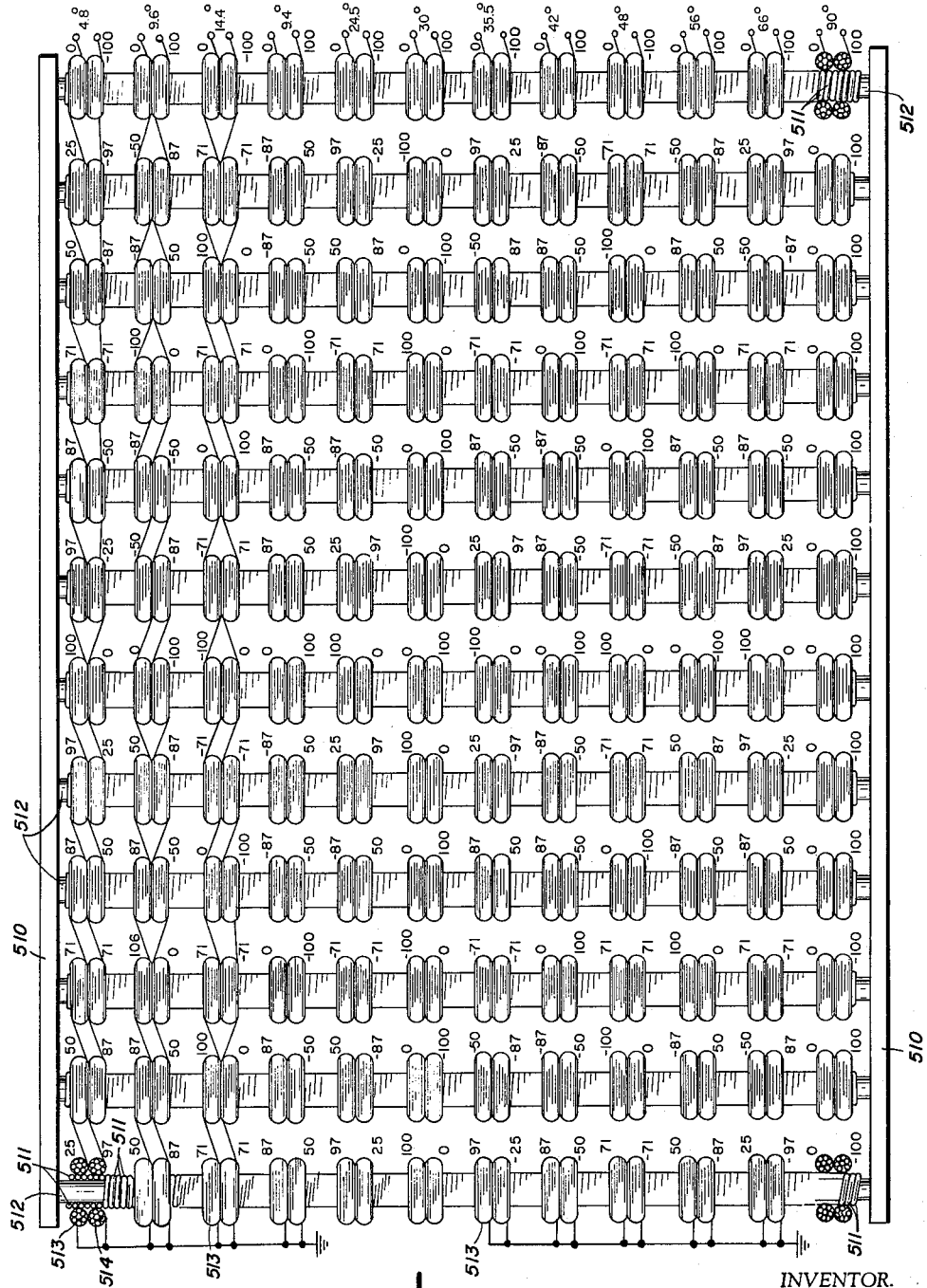
FIG. 5 illustrates a summing matrix of a 12 element–12 beam system utilizing transformer coupling.

FIG. 5 is an assembly drawing of a transformer network designed to operate in the frequency range below a few hundred kilocycles per second.

Primary transformer turns 511 excited by a signal generating means (not shown) or receiving elements are distributed along laminated iron cores 512, one such core and winding for each signal source, hydrophone, or antenna. The laminated iron core framework for the matrix of transformer windings would require modification at higher frequencies. Closing yokes 510 complete the iron core framework.

The secondary windings energizing the output circuits will be again designated the "cosine" set 513 and the "sine" set 514. The number of secondary turns in a "cosine" set coil and the corresponding "sine" set coil are related as the "cosine" and "sine" of an angle. The coils in any set are tandem series connected to a single output circuit. The number of turns in any secondary winding is proportional to the "cosine" and "sine" of the electrical time phase compensation to be imposed on the corresponding signal before it can be linearly added to a selected reference signal.

*Mathematical analysis*

Consider a typical case in which a signal of propagation constant K comes from a distant source at a bearing $\phi$ from the normal to a line of thirteen equally spaced receiving transducers. The "beam" is to be steered toward the source by the network. The frequency band of operation will center where the spacing of receiving elements is a half wave.

The phase of the signal at the $i$th element referred to the 0th is expressible as $$S(i) = \cos(ikd \sin \phi) + j \sin(ikd \sin \phi) \quad (1)$$

in which K is $2\pi/\lambda$ of the signal and $d$ is the common spacing. Abbreviating $$S(i) = \cos iv + j \sin iv, \text{ in which } v = kd \sin \phi$$

Referring again to FIG. 5, twelve beam azimuths for midfrequency are selected to obtain roughly equal increments of $kd \sin \phi$. Turns must now be prescribed for the 144 "sine" and 144 "cosine" secondary windings. Impedance considerations indicate desirability of 100 turns or less for secondary windings. The number prescribed becomes for "cosine" secondaries $$N_c = 100 \cos(i\ 180° \sin \phi) \quad (2)$$

and for "sine" secondaries $$N_s = 100 \sin(i\ 180° \sin \phi) \quad (3)$$

in which, for design purposes, $kd$ the half-wave spacing in radians has been expressed in degrees.

The figures on each secondary 513, 514 of FIG. 5 indicate the number of turns, $N_c$ and $N_s$, for each coil of each "cosine" set and "sine" set. For negative values of $N_s$ of $N_c$ the coil leads are to be reversed.

It is easy to demonstrate mathematically that the vector sum of voltages from a multitude of coils excited by currents whose phase is expressible as $e^{jiv}$ and whose turns are given by $$N_c \sim \cos iv$$
and
$$N_s \sim \sin iv \quad (4)$$

is to a first approximation given by $$E_o \sim n \int_0^v \cos^2 ivdv = \frac{n}{2} + E_s \sim n \int_0^x \sin^2 ivdv = \frac{n}{2}$$

in which $V = nkd \sin \phi$ describes the projected extent of the assemblage, and $n$ denotes the total number of transducer elements in the array.

A technique of applying these teachings to radar beam steering is as described below. Since the summing matrix contemplated utilizes the identical theory and features of the matrixes of FIGS. 1, 3 and 5, and any convenient antenna ensemble can be used, further illustration is deemed unnecessary.

A set of radiators sufficient in number and extent to achieve desired directive gain and beam sharpness is disposed in the most convenient arrangement over a fixed supporting structure. A pair of high-power klystrons or other signal generators able to deliver the required power is excited in phase quadrature. The first delivers a voltage $A \cos wt$ the second $Ae^{j\pi}/2 \cos wt$. The desired beams are specified as to direction and width (including shading for side lobe control). Normally beams are shoulder-to-shoulder with overlap at about 3 db down points. An array of pairs of transmission lines, usually equal in number to the number of beams, is then connected to the two quadrature signal sources by a two-pole multiple throw scanning switch. Each radiator couples to each transmission line with a probe or loop to achieve a predetermined coupling factor.

A complete set of phase compensation values $\delta_{ml}$ is established; $m$ designates the radiating element, $l$ the beam. Thus, a phase retardation $\delta_{ml}$ with respect to a prescribed reference imposed on the excitation of the "$m$"th radiator causes its radiation to be in phase with all other components in the direction of the "$l$"th beam.

The excitation provided the reference element (assumed near the center of the set) from the first generator is given by $$E_1 = A \cos wt$$

For proper compensation the excitation of a nearby element must be $$E_2 = E_1 e^{j\delta_{m1}}$$
$$= A (\cos \delta_{m1} + j \sin \delta_{m1}) \cos wt$$

This is accomplished by adjustment of probe or loop coupling to magnitude $A \cos \delta_{m1}$ and $A \sin \delta_{m1}$ in the "$l$"th pair of transmission lines.

Shaded excitation of off-center elements for lobe suppression is accomplished by further reduction of the coupling to $AB \cos \delta_{m1}$ and $AB \sin \delta_{m1}$, where B is the proper shading factor for the off-center distance of the radiator. It thus appears that the system becomes a two-dimensional coupling matrix with rows given by the number of beams and columns by the number of radiators.

For receiving, a transfer switch disconnects the two signal generators and most simply imposes a +45 degree and −45 degree phase shift as illustrated in FIG. 4 to the signals at the two poles of the scanning switch. The resultants are added and delivered to a suitable display, scope or otherwise.

An alternative form of overall design could be omnidirectional radiation from a single high-power source and simultaneous multiple beam reception by the matrix with simultaneous multibeam display. This eliminates need for a scanning switch. Values of $\delta_{mn}$ are dependent upon frequency and position of radiator as well as azimuth and elevation of the beam. If beam elevation requirements are moderate, the receiving array may be made insensitive to elevation angle and the vertical beam steering achieved using an axially symmetric set of radiators with a matrix vertical angle compensator. High power directivity pattern tests have established that objectionable beam "cross talk" or impedance mismatches do not result from the lack of isolation. Beam decoupling for reception may however be imposed if the attenuation price it imposes is acceptable. Adjustment of probe or loop coupling factor will inevitably modify the output phase. In general the coupling of any one element on any transmission line is slight and coupling phase shifts will be moderate. The radar system described above is superficially similar to a "time" delay matrix which could be classed as conventional technique. The "time" delay network suffers from the requirement of very loose coupling and substantially complete loss of input signal power in a terminating load. This in turn means that, for transmitting purposes, a separate power amplifier is required for each radiator. For receiving application a complete set of amplifiers is required both ahead and behind the delay line.

Obviously many modifications and variations of the present invention are possible in the light of the above teachings. For example a circular array of acoustical transducers could produce an omnidirectional pulse and, utilizing the phase matrix summing technique, receive on a multitude of directional "beams," each with a separate indicator. It is therefore to be understood that within the scope of the appended claims, the invention may be practiced otherwise than as specifically described.

What is claimed is:

1. A multi-beam energy sensing and transmitting system comprising a plurality of energy sensing elements capable of sensing energy of a given frequency, said sensing elements spacially disposed for sensing said energy from a given direction substantially equal in phase, a plurality of pairs of reactive coupling means, each of said pairs coupling energy from a respective one of said sensing means, each of said pairs comprising sine and cosine coupling elements, said sine and cosine elements coupling signals of an amplitude directly proportional to the sine and cosine functions of an angle of phase displacement of said sensed energy resulting from a source angularly displaced from said given direction, the number of pairs of said coupling means connected to each sensing means being equal to the number of source directions of interest, all of said sine coupling elements corresponding to each of said directions of interest connected in additive relationship forming a sine channel for each direction of interest, all of said cosine coupling elements corresponding to each of said directions of interest connected in additive relationship forming a cosine channel for each direction of interest and each sine channel and cosine channel for each direction of interest shifted 90° relative to one another and connected in a series aiding output, and means for indicating the amplitude of each of said outputs.

2. The energy sensing and transmitting system of claim 1 wherein said reactive coupling means are capacitors.

3. The energy sensing and transmitting system of claim 2 wherein said energy sensing elements are electro-magnetic radiators.

4. A multi-beam system comprising a plurality of energy sensing elements for sensing energy of a given frequency, said elements spatially disposed for sensing said energy from a given direction substantially in phase, a plurality of transformers each having a primary winding and a plurality of pairs of secondary windings, one each of said primary windings connected to the output of a different one of said elements, each of said pairs of said secondary windings comprising a sine winding and a cosine winding, said sine and cosine windings having a number of turns proportional to the sine and cosine respectively of the angle of phase displacement of said sensed energy relative to the phase of energy induced in a predetermined reference element, resulting from a source angularly displaced from said given direction, the number of pairs of said secondaries in each transformer being equal to the number of source directions of interest, all of said sine windings corresponding to each of said directions of interest connected in series aiding relationship forming a sine channel for each direction of interest, all of said cosine windings corresponding to each of said directions of interest connected in series aiding relationship forming a cosine channel for each direction of interest, each sine channel and cosine channel for each direction of interest shifted 90° relative to one another and connected in a series aiding output, and means for indicating the amplitude of each of said outputs.

5. The energy sensing system of claim 4 wherein said energy sensing elements are acoustical transducers.

6. A multi-beam energy transmitting and sensing system comprising a plurality of transducers spatially disposed for a predetermined radiation pattern, a plurality of pairs of separate coupling means coupled to each transducer, each of said pairs of said coupling means designed to couple signals proportional in ampltitude to the sine function and the cosine function of the phase displacement of the energy induced relative to the phase of energy induced in a predetermined reference element, said phase displacement corresponding to a predetermined angle of radiation, a separate pair of coupling elements coupled to each transducer for each angle of radiation of interest, a plurality of first summing means for electrically summing the outputs of all cosine coupling means corresponding to the same angle of radiation, a plurality of second summing means for electrically summing the outputs of all sine coupling means corresponding to the same angle of radiation, a plurality of phase shifting means, each cosine and sine summing means for the same angle of radiation coupled to one of a different said phase shifting means, said phase shifting means operable to shift the phase of said sine and cosine summations to an in-phase condition, a plurality of third summing means for electrically summing the outputs of each of said phase shifting means wherein each third summing means sums its respective phase shifted sine and cosine sums and a translation device connected to each of said third summing means.

7. The energy sensing and transmitting system of claim 6 wherein said transducers are electro-magnetic radiators.

8. The energy sensing and transmitting system of claim 7 wherein said coupling means are capacitors.

9. The energy sensing and transmitting system of claim 7 wherein said coupling means are transformers.

10. The energy sensing and transmitting system of claim 6 wherein said transducers are acoustical transducers.

11. The energy sensing and transmitting system of claim 10 wherein said coupling means are transformers.

References Cited in the file of this patent

UNITED STATES PATENTS

| | | |
|---|---|---|
| 2,268,844 | Polkinghorn | Jan. 6, 1942 |
| 2,786,193 | Rich | Mar. 19, 1957 |